US 6,794,656 B2
Sep. 21, 2004

(12) United States Patent
Francke et al.

(54) RADIATION DETECTOR ARRANGEMENT

(75) Inventors: Tom Francke, Sollentuna (SE); Peter Svedenhag, Lidingö (SE); Stefan Thunberg, Lidingö (SE)

(73) Assignee: XCounter AB, Danderyd (SE)

( * ) Notice: Subject to any disclaimer, the term of this patent is extended or adjusted under 35 U.S.C. 154(b) by 160 days.

(21) Appl. No.: 10/131,474

(22) Filed: Apr. 25, 2002

(65) Prior Publication Data

US 2003/0155519 A1 Aug. 21, 2003

(30) Foreign Application Priority Data

Feb. 15, 2002 (SE) .................................. 0200446

(51) Int. Cl.⁷ .............................................. G01T 1/185
(52) U.S. Cl. .................................. 250/385.1; 250/336.1
(58) Field of Search ........................... 250/385.1, 336.1, 250/374, 389, 370.09, 370.1; 378/5, 9, 19, 62, 160

(56) References Cited

U.S. PATENT DOCUMENTS

| | | | | |
|---|---|---|---|---|
| 4,707,608 A | * | 11/1987 | DiBianca | 250/389 |
| 4,780,897 A | * | 10/1988 | McDaniel et al. | 378/62 |
| 4,800,580 A | * | 1/1989 | Houtman et al. | 378/71 |
| 5,008,907 A | * | 4/1991 | Norman et al. | 378/65 |
| 5,025,376 A | | 6/1991 | Bova et al. | |
| 6,067,342 A | | 5/2000 | Gordon | |
| 6,118,125 A | | 9/2000 | Carlson et al. | |
| 6,337,482 B1 | | 1/2002 | Francke | 250/385.1 |
| 6,353,227 B1 | * | 3/2002 | Boxen | 250/363.1 |
| 6,373,065 B1 | | 4/2002 | Francke et al. | 250/374 |
| 6,385,282 B1 | | 5/2002 | Francke et al. | 378/51 |
| 6,414,317 B1 | | 7/2002 | Francke et al. | 250/385.1 |
| 2002/0003860 A1 | | 1/2002 | Francke et al. | 378/98.8 |

FOREIGN PATENT DOCUMENTS

| | | |
|---|---|---|
| DE | 3035529 A1 | 5/1982 |
| EP | 0244292 A1 | 11/1987 |
| GB | 2061055 | 5/1981 |
| WO | WO 00/62094 | 10/2000 |

* cited by examiner

Primary Examiner—Constantine Hannaher
Assistant Examiner—Otilia Gabor
(74) Attorney, Agent, or Firm—Harness Dickey

(57) ABSTRACT

A scanning-based radiation detector arrangement for two-dimensional imaging of an object comprises a plurality of one-dimensional detector units, each comprising an entrance slit, through which ionizing radiation as transmitted through the object is entered, and being arranged for one-dimensional imaging of the ionizing radiation, wherein the detector units are arranged in an array on a support with their respective entrance slits being parallel with each other and facing the source of the ionizing radiation. The detector arrangement further includes a rotating device for rotating the detector unit array in a plane perpendicular to the direction of the ionizing radiation, while the detector units are arranged to repeatedly detect, hence creating a series of two-dimensional images of the object.

24 Claims, 7 Drawing Sheets

RADIATION DETECTOR ARRANGEMENT

FIELD OF THE INVENTION

The invention relates to scanning-based ionizing radiation detector arrangements for two-dimensional detection of an object.

BACKGROUND OF THE INVENTION AND RELATED ART

Gaseous-based ionizing radiation detectors, in general, are very attractive since they are cheap to manufacture, can employ gas multiplication to strongly amplify the signal amplitudes, and provide for detection with high spatial resolution.

A particular kind of gaseous-based ionizing radiation detector is the one, in which electrons released by interactions between photons and gas atoms can be extracted in a direction essentially perpendicular to the incident radiation. Hereby, a strongly improved spatial resolution is achievable.

Such a detector comprises typically planar cathode and anode arrangements, respectively, and an ionizable gas arranged in the space formed between the cathode and anode arrangements. The detector is arranged such that a planar radiation beam from a radiation source can enter the detector sideways between, and essentially parallel with, the cathode and anode arrangements for ionizing the ionizable gas. Further, a voltage is applied between the electrodes for drifting, and optionally multiplying, electrons created during ionization of the ionizable gas. A readout arrangement is arranged in connection to the anode for detecting the charge induced by the drifted electrons.

The detector obviously provides for instantaneous one-dimensional imaging, but to perform two-dimensional imaging the detector, and optionally the radiation source, have to be moved in a direction traverse to the one-dimensional detector array relative to an object being examined while several readouts are recorded. Such scanning-based two-dimensional detection is however time consuming and is impractical if large areas should be imaged. Further, if the object being examined is a human or an animal there is a risk that the human or animal moves during scanning, which could make the image useless or at least severely reduce the spatial resolution obtained.

To reduce scanning time a stacked detector arrangement has been proposed in U.S. Pat. No. 6,118,125 by Francke at al., with which multi-line scans can be achieved. The arrangement includes an X-ray source, which together with a number of collimator windows produce a stack of planar fan-shaped X-ray beams for irradiation of the object to be imaged. The beams transmitted through the object enter the stacked detectors, optionally through a number of second collimator windows, which are aligned with the X-ray beams. The arrangement is moved as a unit to scan an object, which is to be examined.

SUMMARY OF THE INVENTION

In some radiological applications, however, there is a need to provide an image of an object to be examined at high speed in order to observe time-dependent variations. Such applications include, inter alia, recording of series of images to observe time dependent examination, such as e.g. positioning of catheters, and to visualize matter in motion, such as e.g. heart, blood, etc.

The present inventors have noticed that a stacked detector arrangement as the one described in U.S. Pat. No. 6,118,125 is impractical for imaging at high repetition rates. The imaging is performed by a transverse scanning movement, perpendicular to the X-ray beam, and thus the direction of scanning has to be altered for each further image to be recorded. Accordingly, the detector arrangement has to be decelerated, stopped, and accelerated in a reverse direction for each further image recorded and such actions are time-consuming and suffer from stability and alignment problems due to the strong forces the detectors experience during the decelerations and accelerations.

A main object of the invention is therefore to provide a scanning-based ionizing radiation detector arrangement for two-dimensional imaging of an object, which is capable of imaging at high repetition rates without encountering problems of stability or alignment.

A further object of the invention is to provide such a detector arrangement, which comprises a plurality of line detector units in a dense matrix to shorten scanning time and distance for each image recorded.

A yet further object of the invention is to provide such a detector arrangement, which is reliable, accurate, inexpensive, and which has a long lifetime.

These objects, among others, are attained by detector arrangements as claimed in the appended claims.

The inventors have found that by arranging ionizing radiation detector units, well suited to be volume produced with high precision, in an array, and by providing a rotating device for rotating the detector array in one rotation direction only in the plane of the detector array, while detecting repeatedly, a scanning-based detector arrangement for highly resolved two-dimensional imaging of objects at high repetition rates is provided.

Further characteristics of the invention, and advantages thereof, will be evident from the detailed description of preferred embodiments of the present invention given hereinafter and the accompanying FIGS. 1–8, which are given by way of illustration only, and thus are not limitative of the present invention.

DESCRIPTION OF PREFERRED EMBODIMENTS

Figure 1:
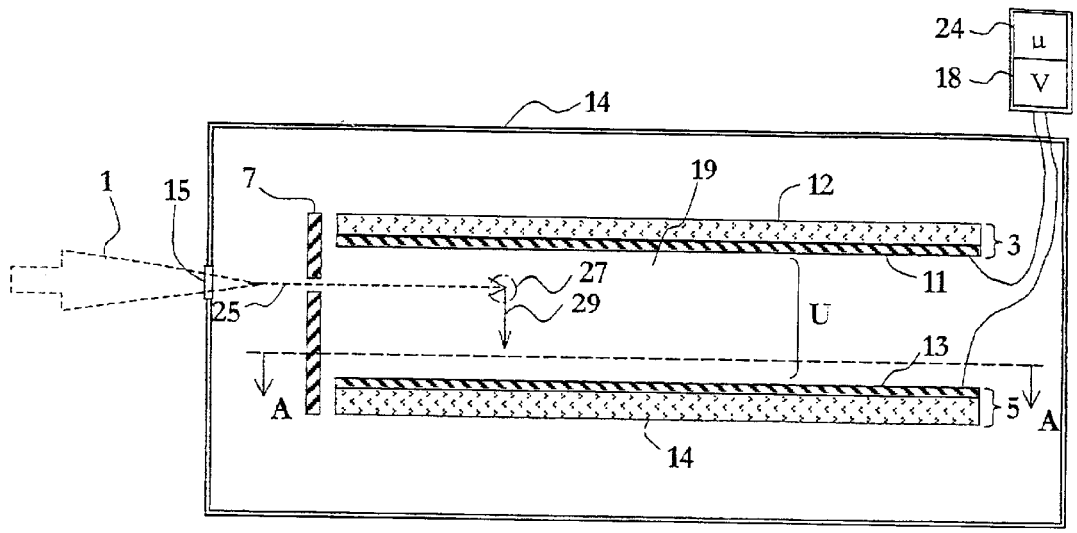
FIG. 1 illustrates schematically, in a cross-sectional side view, a detector unit for use in a scanning-based detector arrangement of the present invention.
Figure 2:
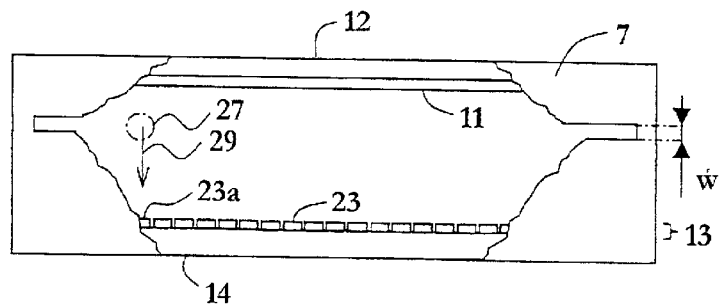
FIG. 2 illustrates schematically, in a front view with an entrance collimator partly removed, the detector unit of FIG. 1.
Figure 3:
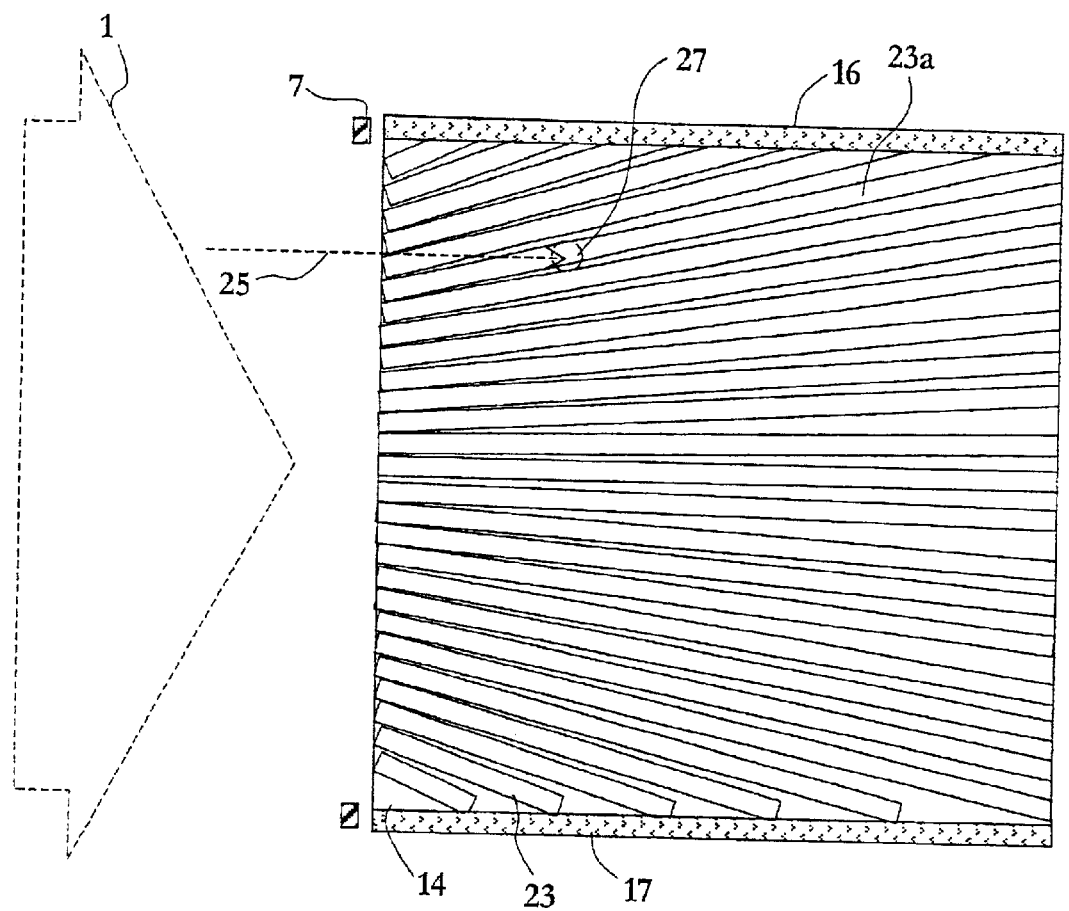
FIG. 3 illustrates schematically a cross-sectional view of the detector unit of FIG. 1 as taken along the line A—A.

With reference to FIGS. 1–3, which are a cross-sectional side view, a front view with collimator portions removed, and a cross-sectional top view, respectively, of a detector unit for use in a scanning-based detector arrangement of the present invention, this detector unit will briefly be overviewed.

The detector unit is oriented such that a planar X-ray beam 1 can enter sideways between a cathode arrangement 3 and an anode arrangement 5. A slit-shaped collimator 7 is provided at the front of the detector unit to form an entrance for the X-ray beam 1 to the detector unit. The slit-shaped collimator 7 may be a thin metallic foil of e.g. tungsten glued to the entrance side of the detector unit, in which a thin slit is etched.

Each of the electrode arrangements 3, 5 includes an electrically conducting electrode layer 11, 13 supported by a respective dielectric substrate 12, 14, wherein the arrangements are oriented such that the cathode 11 and anode 13 layers are facing each other. Preferably, the electrode arrangements 3 and 5 are planar, rectangular and parallel to each other.

The detector unit is arranged within an external gas-tight casing provided with a radiation transparent entrance window (schematically indicated by 14 and 15 in FIG. 1). The ionizable gas or gas mixture may e.g. comprise krypton and carbon dioxide or xenon and carbon dioxide. The gas may be under pressure; preferably in a range 1–20 atm. Spacers, denoted by 16 and 17 in FIG. 3, are provided between the cathode 3 and anode 5 arrangements.

A high voltage DC supply unit (schematically indicated by 18 in FIG. 1) is provided for the purpose of holding the cathode 11 and the anode 13 at suitable electric potentials to create an electric field within the inter-electrode confinement 19 for drift, and optionally amplification, of electrons and ions therein. Conveniently, the cathode 11 is held, during use, at a negative voltage $-V_1$, whereas the anode 13 is grounded.

Still further, the detector unit comprises a readout arrangement for detection of electrons drifted towards the anode 13 and/or ions drifted towards the cathode 11. The readout arrangement is comprised of the anode arrangement 5 itself as illustrated in FIGS. 1–3. Alternatively, a separate readout arrangement may be arranged adjacent anode 13 or adjacent cathode 11, or elsewhere.

To provide for one-dimensional imaging capabilities, the anode/readout layer 13 is comprised of an array of conductive or semiconducting elements or strips 23 arranged side by side and electrically insulated from each other on the dielectric substrate 14. To compensate for parallax errors in detected images, and to thereby provide for an increased spatial resolution, the anode/readout strips extend essentially in directions parallel to the direction of incident photons of the X-ray beam at each location. Thus, given a divergent beam from a point source the anode/readout strips 23 are arranged in a fan-like configuration.

Each of the anode/readout strips is preferably connected to a readout and signal-processing device (schematically indicated by 24 in FIG. 1), whereupon the signals from each strip can be processed separately.

In the case the one-dimensional readout is a separate device, the anode layer 13 can obviously be formed as a unitary electrode without strips.

It shall be appreciated that the distance between the electrode layers 11 and 13 is strongly exaggerated in FIGS. 1 and 2 for illustrative purposes. As an example geometry the detector unit may be 40 mm wide, 2 mm thick and 35 mm deep, whereas the inter-electrode distance may be as short as 0.5 mm. The width w of the collimator slit, which governs the thickness of the sheet of radiation that enters the detector unit, may be as small as 50 $\mu$m. Each readout strip 23 may be 50 $\mu$m wide or narrower, which implies that 1600 or more strips may be arranged side by side in a single detector unit, i.e. much more than illustrated.

In operation, X-rays enter the detector unit through the collimator slit, parallel and close to the cathode arrangement 3. The X-rays will interact with the gas in the detector unit according to an exponential probability distribution where the majority of the X-rays convert early in the gas volume. The average interaction length may typically be 20 mm.

At an interaction, an X-ray photon 25 transmits its energy to an electron in a gas atom, which is released from the atom through a process known as photo effect. This electron travels through the gas and collides with new gas atoms, thereby liberating more electrons until it eventually has lost all its energy and stops. In this process a cloud 27 typically of about thousand electrons is created.

By applying an electric field U between the cathode 11 and the anode 13, these electrons are attracted towards the anode in a direction 29 (vertical in FIGS. 1–2), which is essentially perpendicular to the incoming X-ray photon. If the electric field applied is strong enough, the electrons gain enough energy to knock out further electrons from the gas, which in turn are accelerated, and knock out yet further electrons in an avalanche process. This process is known as gaseous avalanche amplification. As the now large number of electrons approaches the anode, they induce electric signals in the strip 23a nearest to the cloud 27.

The electronic signal is detected by the readout electronics connected to the strip. In the electronics, the signal is amplified and compared with a threshold voltage. If the signal exceeds the threshold voltage, a counter specific for this strip is activated and adds one to a previous value stored. In this way, the number of X-rays impinging above each anode strip is counted. The method is called photon counting.

Alternatively, the signals from several X-rays may be integrated into a common signal, which is either compared to a threshold voltage for counting pulses or digitized to produce a digital number proportional to the integrated value.

Figure 4A:
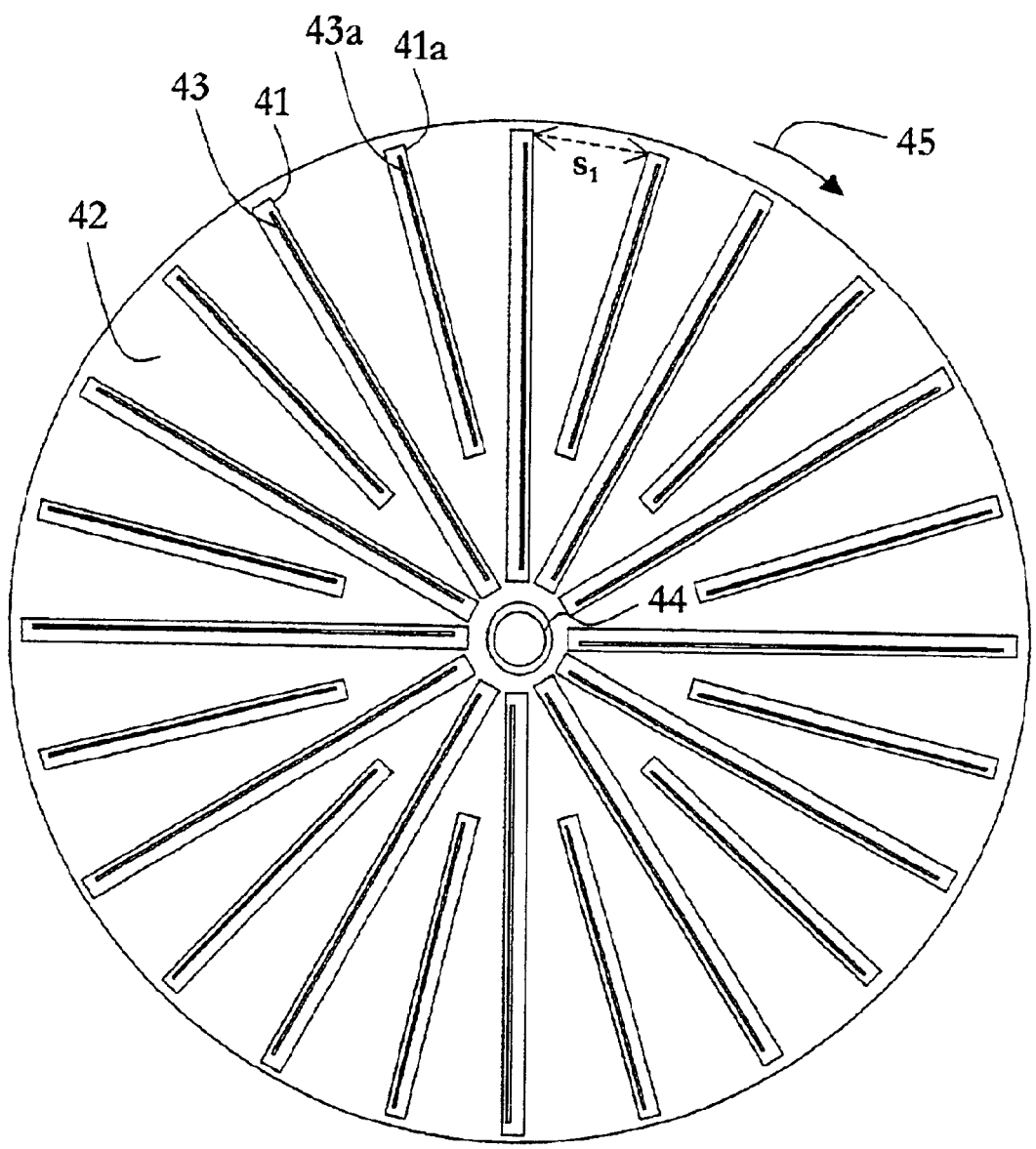
FIG. 4a illustrates schematically, in a front view, a scanning-based detector arrangement according to a first embodiment of the present invention, the arrangement including a plurality of the detector unit of FIGS. 1–3.

With reference now to FIG. 4a, which illustrates schematically, in a front view, an X-ray scanning-based detector arrangement including a plurality of the detector unit of FIGS. 1–3 a first embodiment of the present invention will be described. The arrangement is preferably aimed for acquisition of series of images of lower quality to observe time dependent examination such as e.g. positioning of catheters or of series of images of higher quality at high speed to visualize moving objects, such as e.g. heart, blood, etc., in detail. From the series single images can be extracted for detailed analysis.

The arrangement includes a plurality of line detector units 41, 41a arranged on a common circular support structure 42 in a two-dimensional array with their respective entrance slits 43, 43a facing the front of the arrangement. For illustrative purposes FIG. 4a includes a matrix of 24 detector units: twelve wider detector units 41 symmetrically arranged in a circle on the support 42 and twelve narrower detector units 41a each symmetrically arranged between two adjacent ones of the wider detector units 41. It shall though be appreciated that the arrangement may include many more (or fewer) units. For instance if the detector units are maximally spaced apart by $S_1$=5 mm (from entrance slit 43 to entrance slit 43a) and an area having a radius of typically 10 cm shall be covered the arrangement may include 120–130 detector units. The width of the line detector units may be different as more units are needed further away from the center of the support 42 to maximize the scan length for obtaining a complete two-dimensional image.

Further the detector arrangement of FIG. 4a may include a gas-tight casing similar to the casing denoted 14 in FIG. 1, but common for all the detector units of the detector arrangement of FIG. 4a (not explicitly illustrated). Such casing is provided with entrance window(s) for the incident radiation.

In operation, the object to be examined are placed in front of the detector arrangement such that ionizing radiation from a radiation source as transmitted through the object can impinge onto the detector arrangement and enter through the entrance slits 43, 43a of the respective detector units 41, 41a. The detector arrangement is scanned across the object by rotating the support 42 around a centrally located spindle 44 in the direction of an arrow 45 a distance, while the detector units are repeatedly read out, hence creating one or several two-dimensional images. For the detector arrangement of FIG. 4a one two-dimensional image is produced for each 15°-rotation. A full revolution of the array of detector units will produce a series of 24 two-dimensional images; two full revolutions will produce a series of 48 two-dimensional images; etc.

If the object to be examined is a human patient or an animal, there may be incitements of reducing the radiation dose to the patient or animal. To this end a collimator as the one illustrated in FIG. 5 can be arranged between the radiation source and the patient. The collimator 51 is of a radiation-absorbing material, e.g. tungsten, and includes a plurality of radiation transparent slits 53, 53a aligned with the entrance slits 43, 43a of the detector units of the FIG. 4a arrangement, such that each planar radiation beam as produced by the collimator 51 is transmitted through a respective portion of the patient or animal and is entered into a respective one of the detector units in the FIG. 4a arrangement. The collimator 51 is then rotated together with the detector arrangement during scanning to keep the alignment. For this purpose the collimator 51 is attached to a spindle 54, which is aligned and centered with the spindle 44 of the detector arrangement.

It shall be appreciated that the line detector units are not necessarily arranged on a plane substrate, but are arranged to point towards the radiation source used (point source, line source or 2D source) without any need for individual adjustment such that radiation from the radiation source can enter the respective detector unit parallel with the electrodes thereof. To this end the support structure may consist of a thick metallic plate in which slots are cut away with high precision, in which the individual line detectors are placed. The direction of the slots is such that each line detector points back towards the X-ray source.

For the same purpose the collimator 51 has slits that are less spaced apart than the detector units and narrower than the detector unit entrance slits as the radiation beam is always divergent and the collimator is placed upstream of the detector arrangement. The alignment between the radiation source, the collimator 51 and the detector arrangement provides for multiple planar radiation beams from the radiation source passing through the collimator 51, passing through, or being reflected from, the patient or animal, and entering into the individual detector units 41, 41a of the detector arrangement.

It shall further be appreciated that instead of arranging the individual detector units in circular arrangements on the support 42 they may be arranged in any arbitrary pattern, such as in a two-dimensional array of rows and stacks as is described in our Swedish patent application No. 0200447-1 entitled Radiation detector arrangement, the content of which being hereby incorporated by reference. Preferably though, the one-dimensional detector units are arranged equidistantly or equiangularly.

It is to be noted that if a point-like radiation source is used and aligned with the spindle 44 and if high spatial resolution is needed, the individual detector units are advantageously arranged such that each readout element thereof is located at an approximatively constant distance from the spindle 44 during rotation of the detector arrangement, such that the individual detector units can keep their alignment with the radiation source during scanning.

It shall, however, be noted that the detector arrangement embodiment of FIG. 4a is not capable of detecting at its center due to the presence of the spindle 44. In order to at overcome such a limitation two or four oppositely located ones of the line detector units 41 in FIG. 4 may be extended to overlie the spindle 44.

Figure 4B:
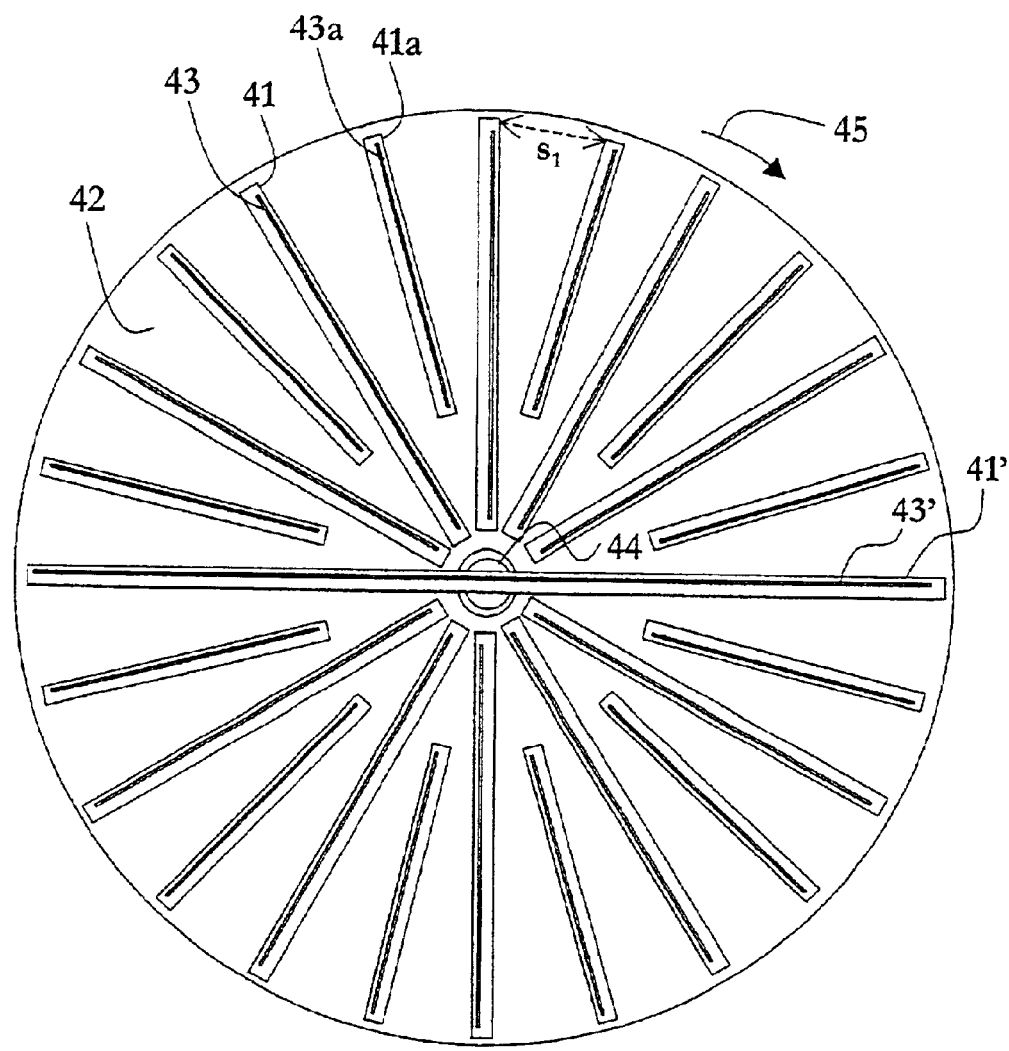
FIG. 4b illustrates schematically, in a front view, a scanning-based detector arrangement according to a second embodiment of the present invention, the arrangement including a plurality of the detector unit of FIGS. 1–3.

FIG. 4b illustrates such a detector arrangement embodiment, wherein two oppositely located ones of the wider detector units 41 of FIG. 4a have been replaced by one very wide detector unit 41' having a long entrance slit 43' extending across substantially the complete diameter of the support 42 and overlying the spindle 44. In other respects the FIG. 4b embodiment is identical with the FIG. 4a embodiment.

By such provision a detector arrangement is obtained, which indeed is capable of detecting at its center and thus complete 2D images may be recorded at very high speed.

Figure 6:
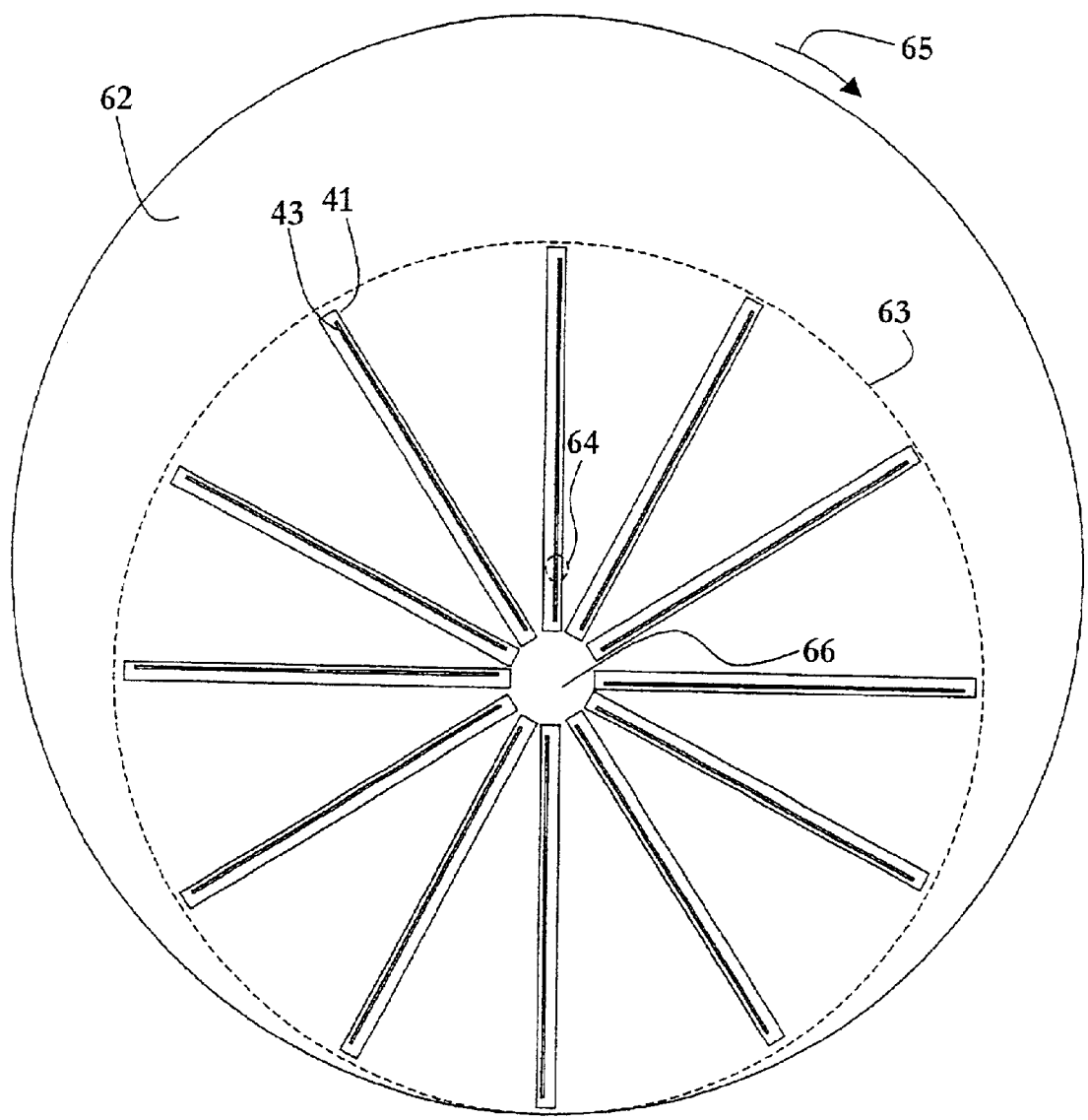
FIG. 6 illustrates schematically, in a front view, a scanning-based detector arrangement according to a third embodiment of the present invention, the arrangement including a plurality of the detector unit of FIGS. 1–3.

With reference next to FIG. 6, which illustrates schematically, in a front view, an X-ray scanning-based detector arrangement, a third embodiment of the present invention will be overviewed, which in fact is capable of detecting also at its center.

Twelve wider detector units 41 are arranged on a circular support 62 with their respective entrance slits 43 aiming towards the radiation source used. The units 41 are here arranged in a circle, schematically indicated by 63, which is smaller and eccentrically located with respect to the circular support 62. The detector arrangement is rotatable around an axis centrally located with respect to the circular support 62 by means of a spindle mounted to the back of the detector arrangement and schematically indicated in FIG. 6 by a dashed circle 64. Note that the entrance slit of one of the detector units is overlying the central axis for the rotation and the individual readout element detecting radiation incident along this central axis will detect the same portion of the object during the scan.

By rotating the detector arrangement around the centrally located axis by the spindle 64 in the direction of arrow 65, the spot indicated by 66, which the detector units do not cover, will perform a circular movement around the axes of rotation, and by repeatedly reading out the detector units thus full two-dimensional images can be created to the cost of longer scanning distance and time.

Figure 7:
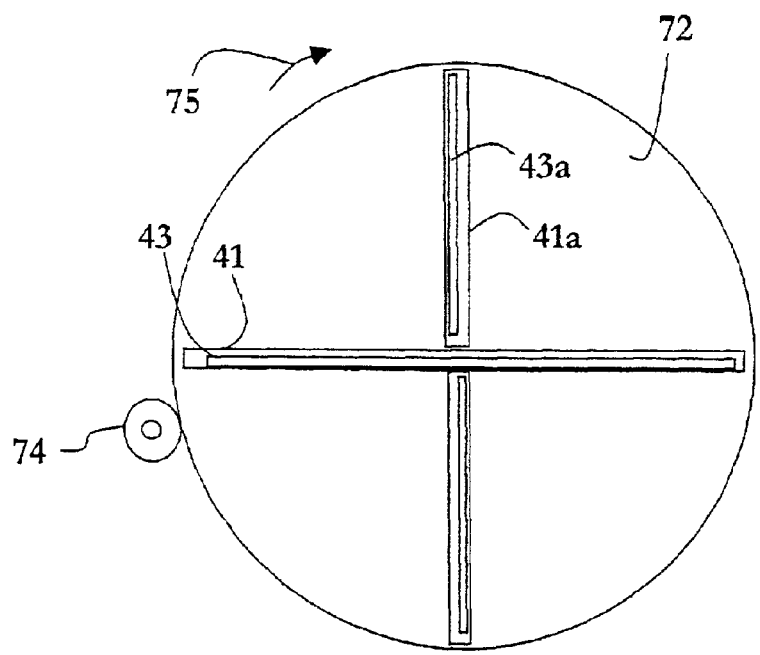
FIG. 7 illustrates schematically, in a front view, a scanning-based detector arrangement according to a fourth embodiment of the present invention, the arrangement including a plurality of the detector unit of FIGS. 1–3.

With reference next to FIG. 7, which illustrates schematically, in a front view, an uncomplicated scanning-based detector arrangement, a fourth embodiment of the present invention will be depicted.

Here, the detector arrangement includes a single line detector unit 41 including an entrance slit 43 in the front across the complete diameter of a circular dielectric substrate 72 and two shorter line detector units 41a, each including an entrance slit 43a in the front, arranged orthogonal to the longer detector unit 41. A driving wheel 74 is arranged to engage with the circular dielectric substrate 72 such that the detector array can be rotated in the plane of the detector units by wheel 74, and thus without mounting a central axis to the detector arrangement. The circular dielectric substrate 72 may for instance be mounted in a bearing or similar (not illustrated).

Such solution is preferably used for any collimators used such that a central axis would not block radiation.

The detector arrangement of FIG. 7 is capable of repetitively creating two-dimensional images of incoming radiation as transmitted through an object to be examined, while the detector units 41, 41a are rotated by the driving wheel 74 in the direction of arrow 75. One image of a large object having a maximum dimension corresponding to the width of the detector unit 41, i.e. the length of the entrance slit 43, is recorded for each quarter of a full revolution.

It shall be appreciated that instead of a driving wheel other mechanisms may be used for rotating the detector array, e.g. a belt driving mechanism, or a gear driving mechanism.

It shall be appreciated that the embodiments of the inventive scanning-based detector arrangement described above with reference to FIGS. 4, 6 and 7 may, instead of including a plurality of the detector unit as illustrated in FIGS. 1–3, be provided with a plurality of line detector units of virtually any kind. These can e.g. be PIN-diode arrays, TFT arrays, CCD arrays or any other type of semiconductor devices.

However, a preferred line detector unit is the gaseous-based ionization detector, optionally provided with an electron avalanche amplifier, and particularly such gaseous-based ionization detector wherein the freed electrons are drifted in a direction essentially perpendicular to the direction of the incident ionization. For further details regarding different kind of gaseous-based detector units for use in the scanning-based detector arrangement of the present invention, reference is made to the following U.S. patent applications by Tom Francke et al. and assigned to XCounter AB, which applications hereby are incorporated by reference: Nos. 08/969554 (issued as U.S. Pat. No. 6,118,125); Ser. Nos. 09/443,292; 09/443,320; 09/443,321; 09/444,569; 09/550288; 09/551603; 09/552692; 09/698174; 09/708521; 09/716228; and Ser. No. 09/760748.

Figure 8:
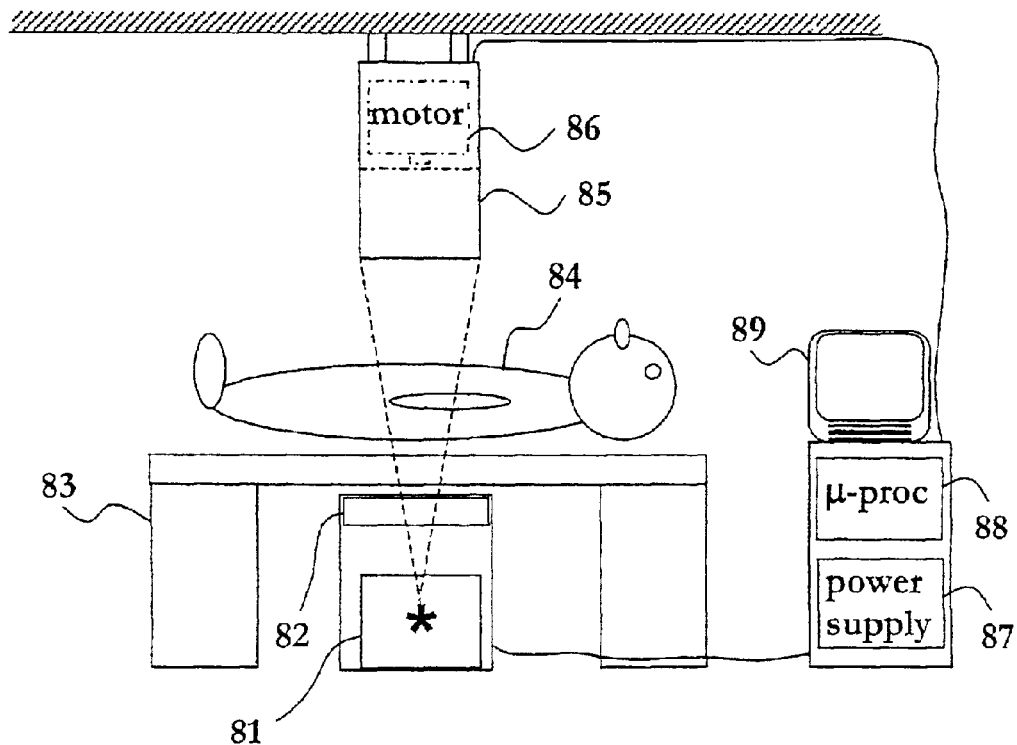
FIG. 8 illustrates schematically, in a side view, a device for X-ray examinations according to the present invention, the device including the scanning-based detector arrangement as illustrated in any of FIGS. 4a, 4b, 6 or 7 and the upstream collimator as illustrated in FIG. 5.

With reference finally to FIG. 8, which illustrates schematically, in a side view, a device for radiology examinations a further embodiment of the present invention will be described.

The device comprises an X-ray source 81, filter/collimator device 82, a patient support 83 for carrying a patient 84 to be examined, and a detector arrangement 85 including a rotational motor 86. The X-ray source 81, the detector arrangement 85 with the rotational motor 86, and optionally the filter/collimator device 82, are connected to a rack housing a power supply 87, a microcomputer 88, and a display unit 89.

The X-ray source 81 is a conventional X-ray tube and is together with the filter/collimator device 82 located beneath the patient support 83. The filter/collimator device 82 may include thin metallic foils acting as filters to absorb the lowest (and sometimes also the highest) energy photons, which do not contribute significantly to the image quality but do increase the radiation dose to the patient, and a collimator for collimating the radiation and shield off scattered radiation.

The detector arrangement may be any of the scanning-based detector arrangements as described above with reference to FIGS. 4, 6 or 7 and the motor 86 is coupled to the spindle thereof. The power supply 87 powers the microcomputer 88, drives the motor, which rotates the spindle and thus the detector arrangement 85 during the scan, and provides the electrical fields in the detector unit(s) of the detector arrangement, whereas the microcomputer 88 is provided with suitable software for controlling the operation of the device including the driving of the motor and the readout during the scan as well as the post-processing of the signals read out from the individual line detector unit(s), wherafter the images are visualized on the display unit 89.

In operation, X-rays are emitted from the X-ray tube 81 and pass through the filter/collimator device 82. The X-rays passing the filter/collimator device 82 traverse the patient 84 on the patient support 83. In the patient, the X-ray photons can be transmitted, absorbed or scattered. The X-rays that are transmitted leave the patient and enter into the detector arrangement entrance slits and are detected.

The procedure for scanning a patient and to thereby produce a two-dimensional X-ray image is as follows. The X-ray source 81 is activated and the detector arrangement 85 is rotated such that the detector arrangement scans across the patient in a direction, which is essentially parallel with the patient.

Each readout element in each line detector is continuously counting the number of X-rays that produce a signal in that individual readout element. Alternatively, the signals from several X-rays may be integrated into a common signal, which is either compared to a threshold voltage for counting pulses or digitized to produce a digital number proportional to the integrated value.

At regular movement intervals the content of each signal is read out and stored in a memory of the microcomputer 88 and all counters or digitizers are reset to zero. In this way, each line detector gives a number of line images of the patient. When the scanning is stopped, all these image segments are grouped together by the microprocessor 92 to form a series of two-dimensional images.

Figure 5:
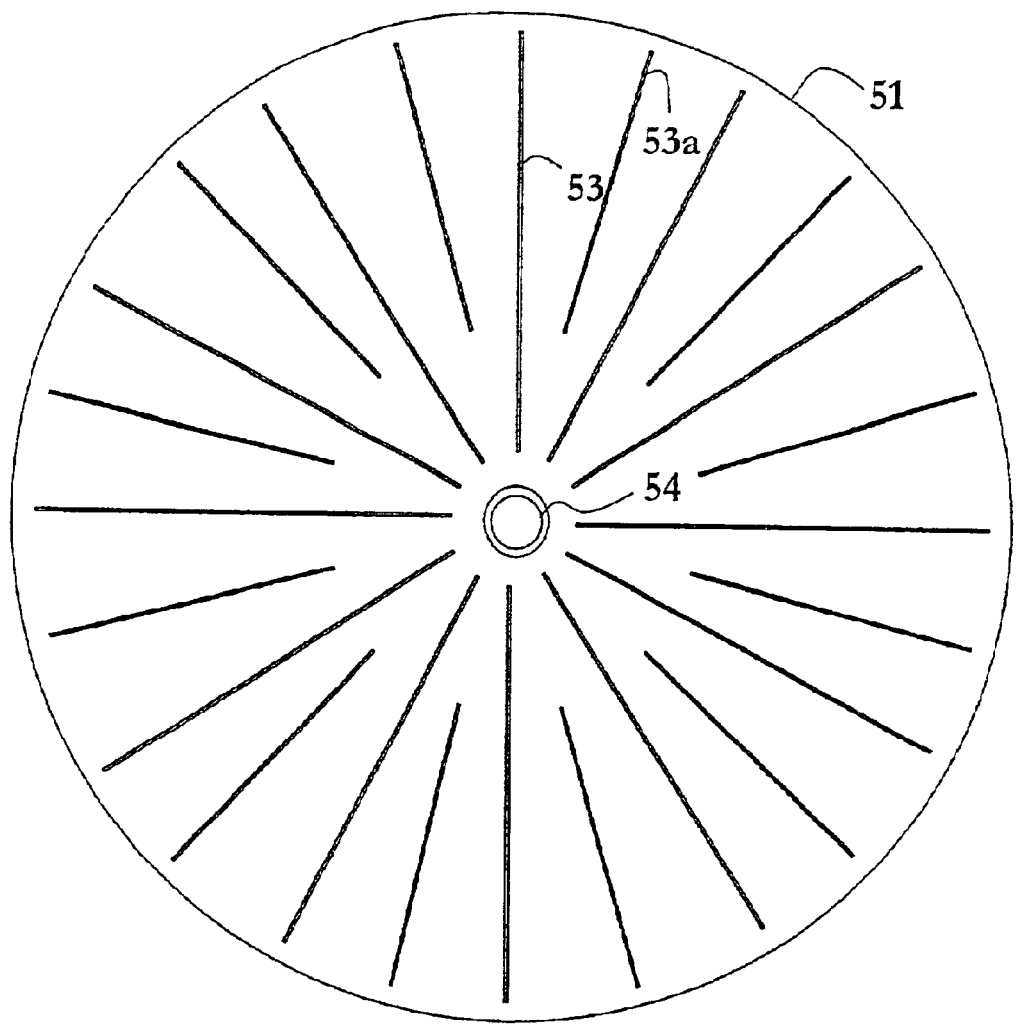
FIG. 5 is a schematic plan view of an upstream collimator, which may be included in e.g. the scanning-based detector arrangement embodiment of FIG. 4a to reduce the radiation dose to an object under examination.

It shall be appreciated that the filter/collimator device 82 device of FIG. 8 may include an upstream collimator such as a thin foil of tungsten with multiple narrow slits etched away, e.g. similar to the collimator of FIG. 5. The slits are aligned such that X-rays passing through each slit will reach a corresponding slit in the detector arrangement. The purpose of this collimator is to reduce the radiation dose to the patient. Only X-ray photons that are capable of entering the detector arrangement entrance slits are allowed to pass through the patient. During scanning the upstream collimator with multiple narrow slits has to be rotated together with the detector arrangement to keep the alignment during the scan. This can be performed in a variety of manners. However, any couplings or components needed therefore and placed in the radiation path have to be transparent to the radiation such that they do not shield off the radiation.

What is claimed is:

1. A scanning-based radiation detector arrangement for two-dimensional imaging of an object comprising a plurality of one-dimensional detector units, each comprising an entrance slit, through which ionizing radiation, as transmitted through said object, is entered, and being adapted for one-dimensional imaging, wherein said plurality of one-dimensional detector units are mounted on a common support structure arranged in a circle with their respective entrance slits facing a source of the ionizing radiation, and extending essentially radially with respect to said circle;

said scanning-based detector arrangement includes a rotating device adapted to rotate said array of one-dimensional detector units relative said object in a plane substantially perpendicular to a direction of the ionizing radiation, while the plurality of one-dimensional detector units are arranged to repeatedly detect, hence creating a series of two dimensional images of the object.

2. The arrangement of claim 1 wherein said plurality of one dimensional detector units are arranged equidistantly or equiangularly.

3. The arrangement of claim 1 wherein said plurality of one-dimensional detector units in said circle include detector units of two or more different widths, wherein the wider detector units have longer entrance slits than the narrower detector units have, and are arranged closer to the center of the circle than the narrower detector units are.

4. The arrangement of claim 1 wherein said circle of one-dimensional detector units is arranged on said support structure concentrically with respect to the rotation axis of said rotation of said array of one-dimensional detector units relative said object.

5. The arrangement of claim 1 wherein said circle of one-dimensional detector units is arranged on said support structure eccentrically with respect to the rotation axis of said rotation of said array of one-dimensional detector units relative said object.

6. The arrangement of claim 1 being aligned such that the central axis of rotation of said rotating device runs through the entrance slit of one of the plurality of one-dimensional detector units.

7. The arrangement of claim 1 wherein said plurality of one-dimensional detector units are oriented such that the ionizing radiation enters the entrance slits of the respective detector units at normal incidence.

8. The arrangement of claim 1 wherein each of said plurality of one-dimensional detector units is a gaseous-based ionizing radiation detector, wherein electrons released by interactions between radiation photons and the gas are extracted in a direction essentially perpendicular to the ionizing radiation entered into that one-dimensional detector unit.

9. The arrangement of claim 8 wherein each of said plurality of one-dimensional detector units comprises an essentially planar cathode and anode, respectively, between which an ionizable gas is arranged, and a readout arrangement including a one-dimensional array of individual readout elements arranged essentially parallel with the entrance slit of that detector unit, the cathode and anode being oriented with respect to the entrance slit such that the ionizing radiation enters the detector unit sideways between, and essentially parallel with, the cathode and anode for ionizing the ionizable gas.

10. The arrangement of claim 9 wherein each of said plurality of one-dimensional detector units comprises an electron avalanche amplifier.

11. The arrangement of claim 9 wherein the width of the entrance slit and the width of each of the readout elements of each of the plurality of one-dimensional detector units are less than 200 $\mu$m.

12. The arrangement of claim 9 wherein the width of the entrance slit and the width of each of the readout elements of each of the plurality of one-dimensional detector units are less than 100 $\mu$m.

13. The arrangement of claim 9 wherein the width of the entrance slit and the width of each of the readout elements of each of the plurality of one-dimensional detector units are less than 50 $\mu$m.

14. The arrangement of claim 1 comprising an upstream collimator of a radiation-absorbing material, which includes a plurality of radiation transparent slits arranged in an array, the number of the radiation transparent slits corresponding to the number of entrance slits of the one-dimensional detector units, where the radiation transparent slits are aligned with the entrance slits of the one-dimensional detector units, such that planar ray bundles are formed when the ionizing radiation from the radiation source is transmitted through the radiation transparent slits of the upstream collimator, which enter into the entrance slits of the respective one-dimensional detector units, and wherein said rotating device is adapted to rotate said upstream collimator with said array of one-dimensional detector units to keep the alignment during the rotation.

15. The arrangement of claim 1 where the ionizing radiation emanates from an X-ray source.

16. The arrangement of claim 1 comprising a space in front of the array of one-dimensional detector units for housing an object to be examined, and through which the ionizing radiation is transmitted before being entered into the entrance slits of the respective one-dimensional detector units.

17. The arrangement of claim 16 adapted for use in radiology examinations and comprising a patient support, on which a patient, a portion of which being the object to be imaged, is placed.

18. The arrangement of claim 1 wherein each angle between two adjacent one-dimensional detector units of said plurality of one-dimensional detector units is 90° or less.

19. The arrangement of claim 1 wherein each angle between two adjacent one-dimensional detector units of said plurality of one-dimensional detector units is 15°.

20. The arrangement of claim 1 wherein each angle between two adjacent one-dimensional detector units of said plurality of one-dimensional detector units is larger than 15°.

21. The arrangement of claim 1 wherein each angle between two adjacent one-dimensional detector units of said plurality of one-dimensional detector units is smaller than 15°.

22. The arrangement of claim 1 wherein said arrangement is arranged for highly resolved two-dimensional imaging of said object at high repetition rate.

23. A scanning-based radiation detection method for two-dimensional imaging of an object, comprising the steps of:

arranging a plurality of one-dimensional detector units, each comprising an entrance slit, through which ionizing radiation, as transmitted through said object, is entered, and being adapted for one-dimensional imaging, in an array with their respective entrance slits facing a source of the ionizing radiation;

repeatedly detecting by the plurality of one-dimensional detector units while rotating said array of one-dimensional detector units, hence creating a series of two-dimensional images of the object, said plurality of one-dimensional detector units are arranged on a common support structure in a circle with their respective entrance slits extending essentially radially with respect to said circle.

24. A scanning-based radiation detection method for two-dimensional imaging of an object, comprising the steps of:

mounting a plurality of one-dimensional detector units on a common support structure arranged in a circle, each having an entrance slit facing a source of ionizing radiation, and extending essentially radially with respect to said circle;

transmitting the ionizing radiation through the object and through the plurality of one-dimensional detector units; and repeatedly detecting, while rotating said array of one-dimensional detector units, to create a series of two-dimensional images of the object.

* * * * *